United States Patent

[11] 3,621,003

| [72] | Inventors | Jan Selman;<br>Hendrik van der Vliet, both of Amsterdam, Netherlands |
|---|---|---|
| [21] | Appl. No. | 849,916 |
| [22] | Filed | Aug. 13, 1969 |
| [45] | Patented | Nov. 16, 1971 |
| [73] | Assignee | Shell Oil Company<br>New York, N.Y. |
| [32] | Priorities | Aug. 26, 1968 |
| [33] | | Great Britain |
| [31] | | 40,715/68;<br>Aug. 26, 1968, Great Britain, No. 40,716/68 |

[54] THERMAL STABILIZATION OF POLYPIVALOLACTONE BY DEGASSING
10 Claims, No Drawings

[52] U.S. Cl. .................................................. 260/78.3
[51] Int. Cl. ........................................ C08g17/017, C08g 53/00
[50] Field of Search ........................................ 260/78.3, 78 L, 75 T, 96; 264/102; 18/12; 159/2 E

[56] References Cited

UNITED STATES PATENTS

| 2,235,127 | 3/1944 | Tyson | 260/94 |
| 2,719,776 | 10/1955 | Kummel | 18/54 |
| 2,833,750 | 5/1958 | Vickers | 260/85.3 |
| 3,311,676 | 3/1967 | Toekes | 260/880 |
| 3,469,618 | 9/1969 | Siclari et al. | 159/48 |
| 3,156,009 | 11/1964 | Alsys | 18/12 |

FOREIGN PATENTS

| 1,090,780 | 11/1967 | Great Britain | 260/78.3 |

*Primary Examiner*—William H. Short
*Assistant Examiner*—Earl A. Nielsen
*Attorneys*—Philip D. Freedman and Joseph W. Brown ABSTRACT: A polymer of a β-lactone is degassed by heating the polymer in the molten state at a temperature of at least 275° C. The process is applicable to polymers which have been prepared at temperatures below the polymer's melting point. An example of such a preparation is a slurry-polymerization of pivalolactone. The resulting degassed polymer can be molded, extruded or injected into articles, nibs or threads.

THERMAL STABILIZATION OF POLYPIVALOLACTONE BY DEGASSING

The invention relates to a process for the manufacture of articles, nibs or threads from a polymer of a β-lactone which polymer has not been above its melting point during its preparation. Polymers of β-lactones coming within the scope of this invention are linear polyesters comprising recurrent structural units of the formula

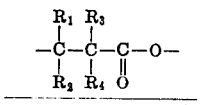

wherein $R_1$, $R_2$ $R_3$ and $R_4$ denote a hydrogen atom or a hydrocarbon radical such as alkyl, alkaryl, aryl or arylalkyl. The hydrocarbon radicals may contain hetero atoms such as halogen atoms. $R_1$, $R_2$, $R_3$, and $R_4$ may be the same or different.

These polyesters can very suitably be prepared by polymerization or copolymerization of one or more β-lactones of the formula

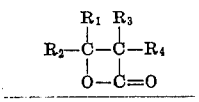

wherein $R_1$, $R_2$, $R_3$ and $R_4$ have the meaning given above. β-lactones wherein the formula given $R_1$ $R_2$ H are very suitable. Preferred β-lactones are those wherein $R_3$ and $R_4$ denote alkyl radicals, more preferably alkyl radicals of not more than four carbon atoms, such as methyl, ethyl, propyl, isopropyl, butyl, for example, α-methyl-α-ethyl-β-propiolactone, α,α-diethyl-β-propiolactone, α-methyl-α-butyl-β-probiolactone, αα-dibutyl-β propiolactone. α,α-Dimethyl-β-propiolactone (also called pivalolactone) is especially preferred as monomer for the preparation of polymers of β-lactones.

Suitable polymers include those which are obtained by polymerization of β-lactones only and polymers obtained by the copolymerization of β-lactones with comonomers which do not contain a β-lactone. The preferred homopolymer is the polymer of α,α-dimethyl-β-propiolactone.

The polymerization or copolymerization of a β-lactone is very conveniently carried out in the presence of a polymerization catalyst. Suitable polymerization catalysts are organic compounds of elements of group VA of the periodic system, such as phosphorus and nitrogen. In this class trihydrocarbyl compounds of phosphorus are particularly suitable. The preferred phosphorus catalyst is a tri-n-butyl phosphine.

It is often of advantage to carry out the polymerization in two steps. In the first step a so-called "living prepolymer" is prepared by polymerizing part of the β-lactone in the presence of a polymerization catalyst which is free of active hydrogen and under such conditions that a polymer with a molecular weight between 200 and 10,000 is formed. In the second step this living prepolymer acts as a polymerization catalyst for the remainder of the β-lactone to be polymerized.

The polymerization or copolymerization of a β-lactone is conventionally carried out in bulk, in suspension or in solution. The present invention relates only to a process for degassing a polymer which polymer has been prepared at temperatures below the polymer's melting point.

It is preferred to carry out the polymerization reaction in a slurry. The so-called "slurry polymerization" denotes a polymerization reaction in the presence of a liquid diluent wherein at least 10 percent by weight of the monomeric starting material is soluble in the liquid diluent and wherein at most only 1 percent by weight of the resulting polymeric material is soluble. The forming polymer precipitates and causes "slurriness" of the polymerization mixture. In polymerizations of this type, low-boiling hydrocarbons such as hexane can be used as the diluent. Mixtures of hydrocarbons can, of course, also be employed. Since the polymerization of a β-lactone is an exothermic reaction, it is often necessary in slurry polymerization to remove part or all of the heat set free during the reaction in order to preclude a high temperature increase with subsequent melting of the polymer formed.

Polymers of β-lactones, also to be referred to as β-lactone polyesters in this specification, are compounds with a high melting point and a high resistance to chemical agents. These polyesters are easily shaped into nibs and articles, including threads, by means of molding and extrusion techniques, such as injection molding, melt spinning and the like.

The term "articles" as used in this specification and accompanying claims denotes objects which are in their definitive form or which are not to be brought into the liquid state in order to be reshaped to their definitive form. Hence, threads are considered to be articles, although they can be reshaped by stretching techniques in the solid state. On the other hand, nibs obtained by cutting strands leaving an extruder are not considered to be articles, since they must be brought into the liquid state in order to be extruded or molded to be reshaped into threads, utensils, or the like.

In order to be molded or extruded, the polymers must be brought into the molten state. At temperatures above the melting point, which in general is between 200° and 300° C., a β-lactone polyester which has not been above its melting point during its preparation shows a tendency to decompose into gaseous products. These gaseous products may decomposed volatile polymer products or gases from volatile residual diluent or solvent which gases were dissolved in the solid polyester. These volatile gases and products are set free from the polyester upon melting. Thus, heating of a homopolymer of pivalolactone to a temperature above its melting point (about 240° C.) gives rise to the formation of isobutylene and carbon dioxide.

In this specification and claims the tendency of a β-lactone polyester to produce gaseous products by setting free volatile products and gases which products and gases are either already present in the polymer or are formed by decomposition of the polymer, is expressed in a quantitative way by the "-gassing tendency." This gassing tendency is the weight percentage of a gas that is set free if a β-lactone polyester or a mixture containing a β-lactone polyester is subjected to a standardized method of heat treatment. This standardized method consists of heating between 100 and 200 mg. of the polymer or of the mixture which contains the polymer, in a closed glass vessel of 0.6–0.7 ml., in a hydrogen atmosphere at 306° C. for 20 minutes. The vessel is then crushed and the amount of gas present (except hydrogen) is determined by gas chromatography.

Articles and nibs prepared by processing a β-lactone polyester with a gassing tendency above 0.2 exhibit unsatisfactory properties since the inclusion of gas bubbles in these articles and nibs after solidification not only renders the articles and nibs nonhomogeneous and unpleasant in appearance but also produces an unfavorable effect on mechanical properties. Also polymers of gassing tendency greater than 0.2 are not amenable to melt spinning since the inclusion of gases in the threads causes a high frequency of breakage.

It has now been found that these disadvantages can be overcome by decreasing the gassing tendency of a β-lactone polyester by means of a heat treatment before the polymer is shaped to articles or nibs. Accordingly, this invention provides a process for the degassing of a polymer of a β-lactone which process comprises heating the polymer in the molten state at a temperature of at least 275° C. The polymer is further characterized as a β-lactone polyester prepared at temperatures below its melting point. The polymer prepared from this process is then shaped into nibs or articles by extrusion or molding.

The β-lactone is degassed by heating to a temperature of at least 275° C. Preferably the polymer is maintained at above this temperature until the gassing tendency is reduced to less than 0.2. The length of time required can be varied according to the type of polymer, the initial gassing tendency thereof, the temperature and the rate at which the gas formed is removed.

Best results are achieved in the present invention by heating the polymer to temperatures between 280° and 320° C. At higher temperatures the polymer may degrade. Temperatures between 280° and 310° C. are in particular preferred.

It has been found that heat treatment as proposed by the present invention not only expels gases which would increase the gassing tendency of a $\beta$-lactone polyester during a shaping operation, but also surprisingly decreases the tendency of the polyester to form polymer degradation products which products would also increase the gassing tendency.

The suppression of the gassing tendency of a $\beta$-lactone polyester according to the invention can be carried out in batch by heating the polymer in a vessel at the required temperature and removing the gases set free by connection of the vessel with a zone with subatmospheric pressure. It is preferred, however, to carry out the suppression of the gassing tendency continuously, by transporting the molten $\beta$-lactone polyester through a zone maintained at the desired temperature.

In a preferred embodiment of the invention, the suppression of the gassing tendency is carried out in a screw extruder, which extruder may be of the single- or multiscrew type. The extruder is conveniently fed with a $\beta$-lactone polyester in the solid state (as powdered polymer) from a hopper, and the polymer is transported by means of the screws while the temperature is increased by means of heating equipment along the barrel of the extruder and by shearing of the polymer in the screw flights. The length of time in which the polymer is kept at the desired temperature can be regulated by the length of the extruder, type and temperature of the heating equipment, the number of the screw flights and the speed of rotation of the screw. The degassed polyester exits from the extruder via a die with one or more holes conveniently provided at the discharge side. The polymer while passing through the extruder is compressed by the depth or pitch of the extruder screws toward the direction of discharge. The $\beta$-lactone polymer is then decompressed to atmospheric pressure upon leaving the extruder. Gases present in the polymer can then escape into the atmosphere. In cases where fairly large amounts of gas are set free, however, this procedure gives rise to some deformation of the strands of the polyester leaving the die holes. It is therefore preferred in cases where the gassing tendency of the polymer is high to use an extruder wherein the polymer is compressed in such contact with a space of atmospheric or subatmospheric pressure, that gases set free during compression can be removed. An extruder with a venting section in open connection with a zone at atmospheric pressure or at subatmospheric pressure can be used for this purpose. The gases set free by the compression and heating of the $\beta$-lactone polyester are transported along the clearances of the screw to the venting section(s), where they are removed from the extruder.

In case the gases set free during the heat treatment according to the invention are removed before the polymer leaves the extruder as by means of a venting section, the polymer which leaves the extruder can immediately be used for the shaping of articles. Thus a spinning head can be provided at the discharge side of the extruder for the processing of the $\beta$-lactone polyester into threads.

In case the gases set free during the heat treatment are not removed before the polymer leaves the extruder, the polymer cannot be used for the shaping of the articles but must be cooled to below the melt temperature of the $\beta$-lactone polyester. The resulting solidified strands are then cut to nibs. The cooling operation can be conveniently carried out in the atmosphere, or in an inert liquid diluent such as water or methanol. The $\beta$-lactone polymer which has been heattreated in an extruder with a venting section can also be cut to nibs after cooling. The nibs can then be used for the shaping of articles.

The degassing tendency of $\beta$-lactone polyesters can also be suppressed by addition of various compounds thereto, as described in copending application No. 785,767, filed Dec. 20, 1968. Examples of these compounds include $\alpha$- or $\beta$-substituted alkyl halides such as beta phenyl ethylchloride complexes of boron halide and a phosphine such a a complex or boron trifluoride and triphenylphosphine arenediazonium salts of complex fluoro acids, such as parachlorobenzendeiazonium hexafluorophosphate, tropylium salts such as tropylium tetrafluoroborate, ammonium chloride and sulfides such as dihydrocarbyl sulfides. These compounds are very suitably added in an amount between 0.0001 and 5, in particular between 0.001 and 1, parts by weight per 100 parts of $\beta$-lactone polyester. In order to obtain a $\beta$-lactone polyester with a very low gassing tendency, it is convenient to add one or more of the compounds which suppress the gassing tendency in the amounts mentioned as discussed above, before, during or after the heat treatment according to the present invention. During the heat treatment according to the invention several types of compounds which stabilize the $\beta$-lactone polyesters against decomposition due to atmospheric influences and light, and pigments, dyes, fillers, nucleating agents and the like may be present. Examples of stabilizers include various amines, such as phenyl-$\beta$-naphthylamine; phenols, such as phenols which contain secondary or tertiary hydrocarbon radicals in orthopositions as substituents, for example, 2,6-diisopropylphenol, 2,6-di-tertbutyl-4-methylphenol, 2,2-bis-(3', 5'-di-tertbutyl-4'-hydroxyphenyl)-propane and 1,3,5-tris-(3', 5'-di-tert-butyl-4'-hydroxybenzyl) -2,4,6-trimethylbenzene, thiuram disulfides, such as tetraalkyl thiuram disulfide; dilauryl-$\beta$-dithiodipropionate; substituted thiourea compounds such as the mono-, di- and trialkyl and aryl thiourea compounds; substituted urea compounds such as the mono-, di- and trialkyl and aryl urea compounds; dithiocarbamates of selenium or tellurium, such as the diethyl dithiocarbamates thereof; arylguanidines, such as the N,N'-diarylguanidines, for example diphenylguanidine and di-ortho-tolylguanidine or organic salts of arylguanidines, such as salts thereof with phthalic acid, carbamic acid, phenylacetic acid, 2,4-dinitrophenol; monoarylhydrazines, such as phenylhydrazine, 4-tolylydrazine, 3-nitrophenyl-hydrazine and 2,4-dinitrophenylhydrazine; organic phosphites, for example tri(nonylphenyl)phosphite, phosphites of polyalcohols such as glycol, glycerol, butanediol, trimethylolpropane, pentaerythritol; organic polythiophosphates, and salts thereof, in particular the zinc salts, such as 0,0-diethylzinc dithiophosphate; nitrosoaromatic compounds, for example 1-nitroso-2-naphthol, 2,4-dinitroso-1,3-resorcinol, N,4-dinitroso-N-methylaniline; benzotriazoles containing a phenolic hydroxyl group, for example 2-(2'-hydroxyphenyl) benzotriazole; benzophenones containing a phenolic hydroxyl group, for example, 2,2'-dihydroxy-4'methoxybenzophenone,2-hydroxy- 4-n-octoxybenzophenone.

Nucleating agents are compounds which influence the crystallization performance of the $\beta$-lactone polyesters in such a way that during crystallization out of the molten state the sp 'ite size is considerably reduced. Reduction of the spherulite size gives rise to the formation of homogeneous crystalline structures, and provides the polyesters with improved physical and mechanical properties as compared with polymers which have solidified from the molten state in the absence of nucleating agents. Examples of nucleating agents include alkali metal halides, such as sodium or potassium chloride; boron nitride; salts of aromatic sulfonic acids, such as the sodium or barium salt of naphthalene-1-sulfonic acid or the sodium salt of 2-aminonapthalene-6,8-disulfonic acid; salts of aromatic phosphonic or phosphinic acids such as the copper salt of benzenephonic acid; salts of aromatic carboxylic acids such as the barium salt of benzoic acid or the sodium salt of 4-tertbutylbenzoic acid or the sodium salt of the monoethyl ester of phthalic acid or the copper salt of pyridine-3-carboxylic acid.

The amount of each of these stabilizers and nucleating agents is a rule between 0.01 and 1 percent by weight of the polymer. Mixtures of several of these stabilizers and nucleating agents can be used. As a matter of course the total amount of stabilizers, pigments, dyes and nucleating agents will not exceed the amount of β-lactone polyester to which they are added, and in general the total amount of these compounds will be below 10 percent by weight of the β-lactone polyester.

The stabilizers, nucleating agents, pigments, dyes and fillers, can be added to the β-lactone polymer before the suppression of the gassing tendency according to the invention or they can be added to the monomer before polymerization, provided they are inert with regard to the polymerization reaction. It is also possible to carry out the heat treatment according to the invention in the absence of stabilizers, nucleating agents, pigments, dyes and fillers, and, if desired, to add one or more of these compounds to the β-lactone polyester obtained during or after the suppression of the gassing tendency. Addition of part of the stabilizers and/or nucleating agents and/or pigments and/or dyes and/or fillers before suppression of the gassing tendency and part thereafter is also possible.

The polymer is of a β-lactone obtained after suppression of the gassing tendency can be shaped to articles by extrusion or molding according to the invention. The polymer with suppressed gassing tendency, which is preferably in the form of nibs, can be processed by extrusion to strips, film and in particular to threads and fibers or molded to utensils, or used for coating purposes.

EXAMPLE I

A polymer of pivalolactone was prepared in two steps. In the first step a "living prepolymer" was synthesized by gradual addition in 0.75 hour of 30 kg. pivalolactone (which contained 0.007 percent weight p-chlorobenzendizonium hexafluorophosphate, a monomer stabilizer) to a vigorously stirred refluxing mixture of 70 kg. pentane and 8 kg. tributyl phosphine. After addition of the pivalolactone the mixture was heated under reflux for 4 hours. The precipitated prepolymer was filtered and washed with acetone. The molecular weight of the living prepolymer was 6,500.

In a second step a polymer of pivalolactone was prepared by adding 2.5 kg. of the living prepolymer to 500 liters refluxing n-hexane with vigorous stirring. To the homogeneous suspension obtained 500 kg. pivalolactone (which contained 1.1 kg. of the ethyl ester of acetylacetic acid as a chain transfer agent of 0.007 percent weight of p-chlorobenzenediazonium hexafluorophosphate) was gradually added in 4 hours. Stirring and refluxing were maintained for another 3 hours. The solid polymer was filtered off, and dried at a pressure of about 20 cm. Hg.

The β-lactone polyester so obtained had a gassing tendency of 0.57. This polymer was fed in powdered form to a twin-screw extruder (diameter 90 mm., length/diameter ratio 9) provided with a feed screw. The extruder was externally heated into four temperature zones (250°, 310°, 318°, 320° C.) with increasing temperatures in the direction of the discharge side of the extruder. The discharge side of the extruder was provided with a die which contained 11 holes, each with a diameter of 4 mm.

The speed of the feed screw to which the polymer was supplied by means of a hopper was 4.1 rotations per minute. The speed of the other screws was 24 rotations per minute. The temperature of the polymer leaving the extruder was 295° C. and the rate of discharge was about 31 kg. per hour.

Gas was allowed to escape from the polymer strands after exiting from the extruder. The strands were quenched in water after the gas escape, and cut to nibs with a length of 44 mm. These nibs had a gassing tendency of 0.16, and were easily shaped to filaments of good quality by means of melt spinning.

EXAMPLE II

The β-lactone polymer described in example I was fed to a single- screw extruder (diameter 60 mm., length/diameter ratio 30) with a venting section attached at 60 cm. before the discharge end of the extruder. Four temperature zones before the venting section of the extruder were maintained at temperatures of 240°, 270° and 300° C., respectively (increasing temperature in the direction of the venting zone) and two temperature zones after the venting section were kept at 300° C. The venting section was kept at a pressure of about 20 cm. Hg. The discharge side of the extruder was provided with a die with 10 holes each with a diameter of 4 mm.

The speed of the screw was 80 rotations per minute. The temperature of the polymer leaving the extruder was 295° C., and the rate of discharge about 49 kg./hr. The strands leaving the extruder were quenched in water and cut to nibs with a length of 4 mm. These ribs had a gassing tendency of 0.04, and were easily shaped into filaments by means of melt spinning.

EXAMPLE III

A β-lactone polyester prepared in a similar manner to the β-lactone polyester described in example I, and having a gassing tendency of 0.43, was degassed at three temperatures in a single-screw extruder, with a diameter of 30 mm. and a length/diameter ratio of 20, which was provided with a discharge die with one hole (diameter 4 mm.). The screw speed was 30 rotations per minute and the rate of discharge about 3 kg./hr. The extruder had 4 temperature zones along its barrel. The settings of these temperature zones (increasing in the direction of the discharge side of the extruder), the temperature of the polymer strand leaving the extruder and the gassing tendency of the 4-mm. nibs cut from the strand after cooling are recorded in table I. As can be seen from this table, the temperature of the polymer leaving the extruder in experiment 1 (which is not according to the invention) was 265° C. This polymer had a gassing tendency about 0.2. The nibs obtained in experiment 1 could not conveniently be melt spun to threads because of frequent thread breakage. No such trouble was encountered in melt spinning of nibs obtained according to experiments 2 and 3. These nibs were easily shaped to threads of good quality.

TABLE I

| Experiment | Temperature of zones of extruder, ° C. | | | | Temperature of polymer leaving the extruder, ° C. | Gassing tendency of nibs |
|---|---|---|---|---|---|---|
| | 1 | 2 | 3 | 4 | | |
| 1 | 240 | 255 | 270 | 265 | 260 | 0.32 |
| 2 | 240 | 260 | 275 | 280 | 275 | 0.14 |
| 3 | 240 | 285 | 295 | 300 | 295 | 0.09 |

The beta-lactone polyester described in example 1 was fed to a spin-extruder with a diameter of 18 mm. and a length/diameter ratio of 30. A venting section was present at a distance of 36 cm. (20 diameters) from the feed opening. The spin-extruder had three heating zones before the venting section, which were kept at temperatures of 245', 295° and 300° C. (increasing temperature in direction of the venting section), and one heating zone after the venting section which was kept at 260° C. The speed of the screw was 75 rotations per minute, the venting section was kept at a pressure about 20 cm. Hg. The spin-extruder was provided with a spinning head, which was externally heated in two zones at temperatures of respectively 270° and 285° C. The output of the extruder (about 600 g./hr.) was fed to a spinpump which was present in the spinning head. This spinpump, which had a capacity of 0.3 ml. per rotation, was run at a speed of 35 rotations per minute.

A spinnerette containing 8 holes, each with a diameter of 0.4 mm. was used. The winding speed of the threads leaving the spinnerette was 90 meters per minute, the drawdown ratio applied was about 90. Threads of high quality were produced in this spin extruder from the β-lactone polyester of example I. The tighter of these threads was about 100 denier.

In an experiment carried out for comparison the venting section was closed, and go gases set free during the heat treatment. The same polyester was fed into the spinnerette. Threads leaving the spinnerette was frequently broken and could not be successfully processed.

We claim as our invention:

1. A process for the degassing of a polymer of a β-lactone which comprises heating said polymer in the molten state at a temperature of between 280° and 320° C. until the weight percentage of gas other than hydrogen set free by heating between 100–200 mg. of the polymer in a closed glass vessel of 0.6–0.7-ml. capacity in a hydrogen atmosphere at 306° C. for 20 minutes is the polymer to less than 0.2, said polymer characterized as prepared at temperatures below its melting point.

2. A process according to claim 1, characterized in that the polymer of a β-lactone is obtained by polymerization of one or more β-lactones of the formula

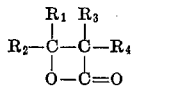

wherein $R_1$, $R_2$, $R_3$ and $R_4$ denote a hydrogen atom, or a hydrocarbon radical, which hydrocarbon radical may contain hereto atoms, and $R_1$, $R_2$, $R_3$ and $R_4$ can be the same or different.

3. A process according to claim 2, characterized in that the $R_1$ $R_2$ H.

4. A process according to claim 3, characterized in that the β-lactones are α, α-propiolactones, in which each of the alkyl groups has no more than four carbon atoms.

5. A process according to claim 4, characterized in that the β-lactone is α, α-dimethyl-β-propiolactone.

6. A process according to claim 1, characterized in that the polymer is homopolymer of α, α-dimethyl-β-propiolactone.

7. A process according to claim 1, characterized in that the polymerization is carried out in the presence of a tri-n-butylphosphine catalyst.

8. A process according to claim 1, characterized in that the polymer of a β-lactone is obtained by slurry polymerization of a β-lactone.

9. A process according to claim 1, characterized in that the heating is carried out at a temperature between 200° and 310 C.

10. A process according to claim 9, characterized in that the heating of the polymer is carried out in a screw extruder.

* * * * *

PO-1050
(5/69)

UNITED STATES PATENT OFFICE
CERTIFICATE OF CORRECTION

Patent No. 3,621,003  Dated November 16, 1971

Inventor(s) JAN SELMAN and HENDRIK VAN DER VLIET

It is certified that error appears in the above-identified patent and that said Letters Patent are hereby corrected as shown below:

In claim 1, at column 7, line 17, delete "the polymer to";

Claim 3, at column 8, line 8, "$R_1R_2H$" should read -- $R_1=R_2=H$ --;

Claim 6, at column 8, line 15, between "is" and "homopolymer", insert -- a --;

Claim 9, at column 8, line 23, "200° and 310" should read -- 290° and 310° --;

Claim 10, at column 8, line 25, "9" should read -- 1 --.

Signed and sealed this 23rd day of May 1972.

(SEAL)
Attest:

EDWARD M. FLETCHER, JR.
Attesting Officer

ROBERT GOTTSCHALK
Commissioner of Patents